(12) United States Patent
Gandelman et al.

(10) Patent No.: US 11,425,027 B2
(45) Date of Patent: Aug. 23, 2022

(54) TURN-BASED DEADLOCK-FREE ROUTING IN A CARTESIAN TOPOLOGY

(71) Applicant: MELLANOX TECHNOLOGIES TLV LTD., Raanana (IL)

(72) Inventors: Michael Gandelman, Haifa (IL); Jose Yallouz, Kibbutz Shaar Hamakim (IL); Lion Levi, Yavne (IL); Tamir Ronen, Pardes Hana-Karkur (IL); Aviad Levy, Ge'alya (IL); Vladimir Koushnir, Rishon Lezion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 75 days.

(21) Appl. No.: 17/086,412

(22) Filed: Nov. 1, 2020

(65) Prior Publication Data

US 2022/0141125 A1    May 5, 2022

(51) Int. Cl.
*H04L 45/00* (2022.01)
*H04L 45/02* (2022.01)
(Continued)

(52) U.S. Cl.
CPC ........... *H04L 45/20* (2013.01); *H04L 45/02* (2013.01); *H04L 45/06* (2013.01); *H04L 45/122* (2013.01); *H04L 45/22* (2013.01); *H04L 49/30* (2013.01)

(58) Field of Classification Search
CPC ......... H04L 45/20; H04L 45/02; H04L 45/06; H04L 45/122; H04L 45/22; H04L 49/30
See application file for complete search history.

(56) References Cited

U.S. PATENT DOCUMENTS 5,533,198 A    7/1996    Thorson
6,031,835 A    2/2000    Abali et al.
(Continued)

FOREIGN PATENT DOCUMENTS

CN    101262444 A    9/2008
EP    2662778 A1    11/2013
(Continued)

OTHER PUBLICATIONS

Seitz et al., "The architecture and programming of the Ametek series 2010 multicomputer", C3P Proceedings of the 3rd Conference on Hypercube concurrent computers and applications: Architecture, software, computer systems, and general issues, vol. 1, pp. 33-36, Pasadena, USA, Jan. 19-20, 1988.
(Continued)

*Primary Examiner* — Min Jung
(74) *Attorney, Agent, or Firm* — Kligler & Associates Patent Attorneys Ltd

(57) ABSTRACT

An apparatus includes an interface and a processor. The interface communicates with a network including network elements interconnected in a Cartesian topology. The processor defines first and second groups of turns, each turn includes a hop from a previous network element to a current network element and a hop from the current network element to a next network element. Based on the turns, the processor specifies rules that when applied to packets traversing respective network elements, guarantee that no deadlock conditions occur in the network. The rules for a given network element include (i) forwarding rules to reach a given target without traversing the turns of the second group, and (ii) Virtual Lane (VL) modification rules for reassigning packets, which traverse turns of the first group and which are assigned to a first VL, to a different second
(Continued)

VL. The processor configures the given network element with the rules.

24 Claims, 5 Drawing Sheets

(51) Int. Cl.
*H04L 45/122* (2022.01)
*H04L 49/00* (2022.01)

(56) References Cited

U.S. PATENT DOCUMENTS

| | | | |
|---|---|---|---|
| 6,859,435 | B1 | 2/2005 | Lee et al. |
| 6,918,063 | B2 | 7/2005 | Ho et al. |
| 7,620,736 | B2 | 11/2009 | Westfall |
| 8,391,282 | B1 | 3/2013 | Lu et al. |
| 9,009,648 | B2 | 4/2015 | Kumar et al. |
| 9,294,385 | B2* | 3/2016 | Gusat .................. H04L 45/48 |
| 9,509,613 | B1* | 11/2016 | Denzel .................. H04L 45/60 |
| 10,200,294 | B2 | 2/2019 | Shpiner et al. |
| 10,404,574 | B2 | 9/2019 | Zdornov et al. |
| 2001/0038634 | A1* | 11/2001 | Dally .................. H04L 45/00 370/389 |
| 2002/0029287 | A1 | 3/2002 | Yemini et al. |
| 2003/0043756 | A1 | 3/2003 | Reynders et al. |
| 2008/0285458 | A1 | 11/2008 | Lysne |
| 2009/0046727 | A1 | 2/2009 | Towles |
| 2011/0149981 | A1 | 6/2011 | Klausler |
| 2012/0170582 | A1* | 7/2012 | Abts .................. H04L 45/06 370/392 |
| 2013/0114620 | A1 | 5/2013 | Bogdanski |
| 2013/0124910 | A1 | 5/2013 | Guay et al. |
| 2013/0308444 | A1 | 11/2013 | Sem-Jacobsen et al. |
| 2013/0311697 | A1 | 11/2013 | Abel et al. |
| 2014/0044015 | A1 | 2/2014 | Chen et al. |
| 2014/0064287 | A1 | 3/2014 | Bogdanski et al. |
| 2014/0146666 | A1 | 5/2014 | Kwan et al. |
| 2014/0204738 | A1 | 7/2014 | Carter et al. |
| 2015/0030034 | A1 | 1/2015 | Bogdanski et al. |
| 2015/0249590 | A1 | 9/2015 | Gusat et al. |
| 2016/0012004 | A1 | 1/2016 | Arimilli et al. |
| 2016/0323127 | A1 | 11/2016 | Pande et al. |
| 2018/0109446 | A1* | 4/2018 | Srinivasan .............. H04L 45/28 |
| 2018/0145881 | A1 | 5/2018 | Zdornov et al. |
| 2018/0145900 | A1* | 5/2018 | Zdornov .............. H04L 45/122 |
| 2019/0007300 | A1 | 1/2019 | Karanam et al. |
| 2019/0058651 | A1 | 2/2019 | McDonald |
| 2021/0044513 | A1* | 2/2021 | Ronen .................. G06F 13/4036 |
| 2022/0078104 | A1* | 3/2022 | Yallouz .................. H04L 45/22 |

FOREIGN PATENT DOCUMENTS

| | | | |
|---|---|---|---|
| EP | 3013008 | A1 | 4/2016 |
| GB | 2508891 | A | 6/2014 |
| JP | 2011147152 | A | 7/2011 |
| WO | 2012162988 | A1 | 12/2012 |
| WO | 2013044469 | A1 | 4/2013 |

OTHER PUBLICATIONS

Dally et al., "Deadlock-free message routing in multiprocessor interconnection networks", IEEE Transactions on Computers, vol. C-36, issue 5, pp. 547-553, May 1987.
Glass et al., "The turn model for adaptive routing", Proceedings of the 19th annual international symposium on Computer architecture (ISCA '92), pp. 278-287, Queensland, Australia, May 19-21, 1992.
Underwood et al., "A unified algorithm for both randomized deterministic and adaptive routing in torus networks", IEEE International Symposium on Parallel and Distributed Processing Workshops and Phd Forum (IPDPSW), pp. 723-732, May 16-20, 2011.
Sancho et al., "Analyzing the Influence of Virtual Lanes on the Performance of InfiniBand Networks", Proceedings of the International Parallel and Distributed Processing Symposium, pp. 1-10, year 2002.
Shim et al., "Static Virtual Channel Allocation in Oblivious Routing", 3rd ACM/IEEE International Symposium on Networks-on-Chip, pp. 1-6, May 10-13, 2009.
Domke et al., "Deadlock-Free Oblivious Routing for Arbitrary Topologies", Proceedings of the 2011 IEEE International Parallel & Distributed Processing Symposium (IPDPS '11), pp. 616-627, May 16-20, 2011.
Upadhyay et al., "Routing Algorithms for Torus Networks", International Conference on High Performance Computing, New Delhi, India, pp. 1-6, Dec. 27-30, 1995.
Scheideler, C., "Basic routing theory I—Oblivious routing", The Johns Hopkins University, Theory of Network Communication, Lecture 3, pp. 1-8, Sep. 23-25, 2002.
Singh et al., "Locality-Preserving Randomized Oblivious Routing on Torus Networks", Proceedings of the 14th Annual ACM Symposium on Parallel Algorithms and Architectures, pp. 9-13, Aug. 10-13, 2002.
Dally et al., "Deadlock-free adaptive routing in multicomputer networks using virtual channels", IEEE Transactions on Parallel and Distributed Systems, vol. 4, Issue 4, pp. 466-475, Apr. 1, 1993.
EP Application # 20189951.5 Search Report dated Dec. 3, 2020.
Ahn et al., "HyperX: Topology, routing, and packaging of efficient large-scale networks", Proceedings of the Conference on High Performance Computing Networking, Storage and Analysis, pp. 1-11, Nov. 14-20, 2009.
Verma, "Mesh interconnection network definition, advantages, disadvantages", Engineer's Portal, pp. 1-4, Feb. 28, 2016.
InfiniBand Architecture Specification, vol. 1, Release 1.2.1, pp. 1-1727, Nov. 2007.
Ronen et al., U.S. Appl. No. 16/535,100, filed Aug. 8, 2019.
U.S. Appl. No. 16/535,100 Office Action dated Feb. 4, 2021.
U.S. Appl. No. 16/535,100 Final Office Action dated Apr. 22, 2021.
EP Application # 21205534.7 Search Report dated Mar. 16, 2022.
CN Application # 202010793649.9 Office Action dated Dec. 20, 2021.

* cited by examiner

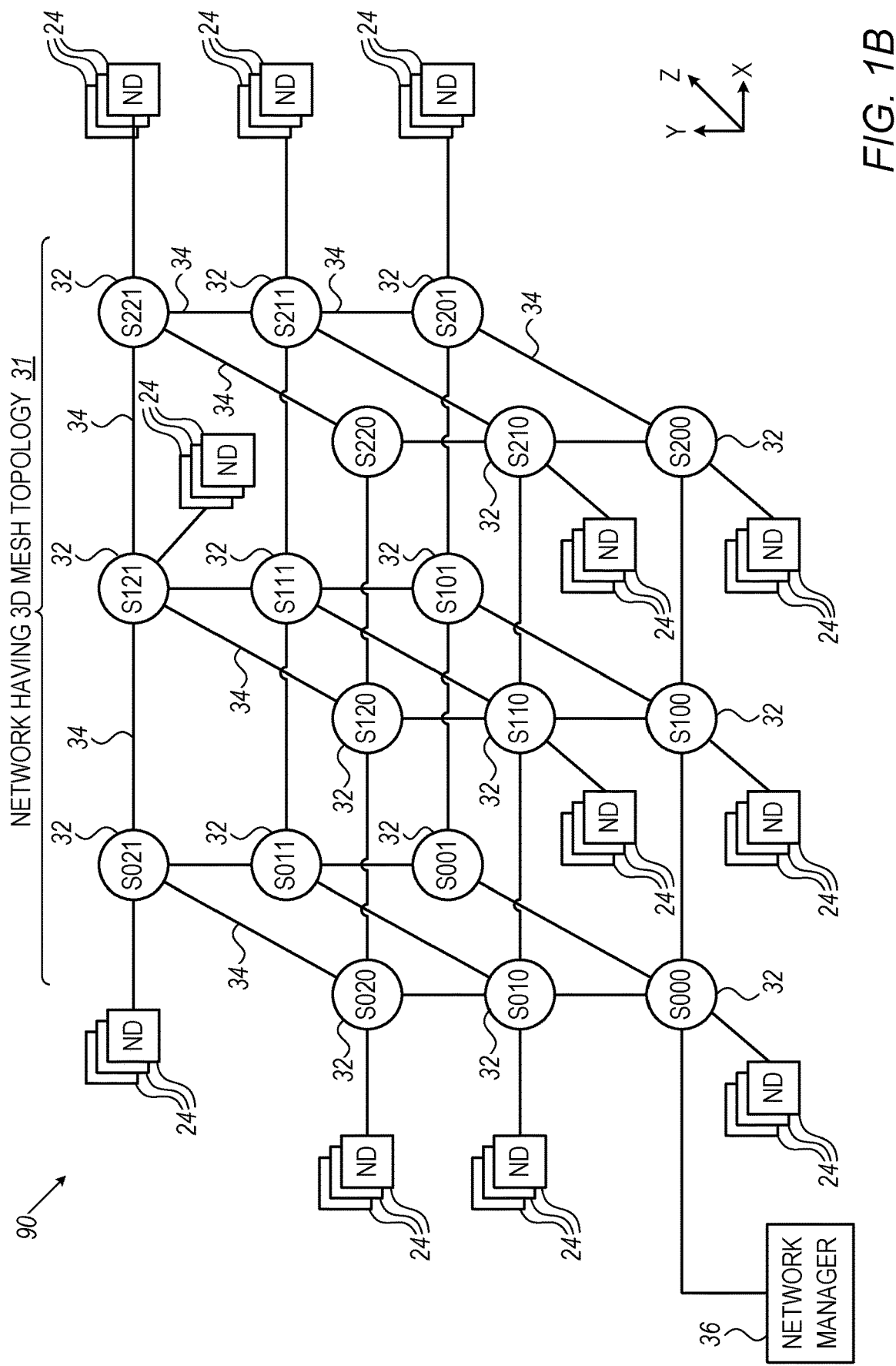

TURN-BASED DEADLOCK-FREE ROUTING IN A CARTESIAN TOPOLOGY

TECHNICAL FIELD

Embodiments described herein relate generally to data communication, and particularly to methods and systems for deadlock-free routing in networks having a Cartesian topology.

BACKGROUND

A communication network typically comprises multiple network elements such as switches or routers interconnected with one another. The network elements typically buffer incoming packets before sending the packets to a selected next-hop network element and employ flow control measures to prevent previous-hop network elements from causing buffer overflow. A deadlock condition may occur in the network, when the buffers of multiple network elements having cyclic dependency become full. Deadlock conditions are likely to occur in Cartesian network topologies such as mesh, torus, hypercube and HyperX topologies.

Methods for packet routing that avoid deadlock conditions are known in the art. For example, U.S. Patent Application Publication 2019/0058651 describes routing packets using distance classes in multidimensional networks. A packet is received at a network device in a fully connected multidimensional network and all possible candidate output ports for the packet to be routed to the destination network device are determined. The candidate output ports correspond to candidate minimal paths and candidate non-minimal paths between the network device and the destination network device along all remaining unaligned dimensions of the multidimensional network. An optimal output port among all the candidate output ports is selected and the packet is routed to a next hop in the network though the optimal output port and using a next distance class.

U.S. patent Ser. No. 10/404,574 describes an apparatus that includes a network interface and a processor. The network interface is configured to communicate with a network that includes a plurality of switches interconnected in a Cartesian topology having multiple dimensions. The processor is configured to predefine an order among the dimensions of the Cartesian topology, to search for a preferred route via the network from a source switch to a destination switch, by evaluating candidate routes based at least on respective numbers of switches along the candidate routes for which traversal to a next-hop switch changes from one of the dimensions to another of the dimensions opposite to the predefined order, and to configure one or more of the switches in the network to route packets from the source switch to the destination switch along the preferred route.

In a paper entitled "HyperX: topology, routing, and packaging of efficient large-scale networks, published in: "Proceedings of the Conference on High Performance Computing Networking, Storage and Analysis," 14-20 Nov. 2009, the authors consider an extension of the hypercube and flattened butterfly topologies, the HyperX, and give an adaptive routing algorithm, DAL.

SUMMARY

An embodiment that is described herein, provides an apparatus that includes a network interface and a processor. The network interface is configured to communicate with a network including a plurality of network elements interconnected in a Cartesian topology. The processor is configured to define a first group of turns and a second group of turns in the topology, wherein each turn in the first group and each turn in the second group comprises an input hop from a previous network element to a current network element and an output hop from the current network element to a next network element. Based on the turns in the first and second groups, the processor is configured to specify rules that when applied to packets traversing respective network elements, guarantee that no deadlock conditions occur in the network. The rules specified for a given network element include (i) forwarding rules from one or more input ports to one or more output ports so as to reach a given target coupled to the network without traversing any of the turns of the second group, and (ii) Virtual Lane (VL) modification rules for reassigning packets, which traverse turns of the first group and which are assigned to a first VL, to a different second VL. The processor is further configured to configure the given network element with the rules.

In some embodiments, the processor is configured to identify a given turn that occurs in traversing the given network element from an input port to an output port, and to specify at least one of the rules (i) depending on whether the given turn belongs to the first group, for packets assigned to the first VL and (ii) depending on whether the given turn belongs to the second group for packets assigned to the second VL. In other embodiments, the processor is configured to specify a forwarding rule that forbids the given turn, in response to detecting that the given turn belongs to the second group. In yet other embodiments, the processor is configured to specify a forwarding rule that forbids the given turn, in response to detecting that a packet traversing the given turn belongs to the first group.

In an embodiment, the processor is configured to, in response to detecting that the given turn belongs to the first group, specify (i) a forwarding rule that permits the given turn and (ii) a corresponding VL modification rule that modifies the VL in the packet to the second VL. In another embodiment, the processor is configured to specify a forwarding rule that permits a turn from an input port to an output port only when traversing the turn reduces a number of remaining hops to the given target. In yet another embodiment, the processor is configured to specify a forwarding rule that permits a turn that does not reduce a number of remaining hops to the given target but that meets a specified total number of hops per path.

In some embodiments, the processor is configured to, in response to detecting that a path from the given network element to the target must contain a turn that belongs to the second group, specify a forwarding rule that forbids traversing the path. In other embodiments, the Cartesian topology comprises a Cartesian topology selected from a list of Cartesian topologies comprising the Mesh, Torus, Hypercube, generalized Hypercube and HyperX topologies topology. In other embodiments, the Cartesian HyperX topology comprises up to three dimensions, and the processor is configured to specify the rules, so as to guarantee between any pair of network elements in the network, at least one path of up to three hops. In yet other embodiments, the processor is configured to specify a VL modification rule that refrains from modifying the VL of a packet assigned to the second VL.

There is additionally provided, in accordance with an embodiment that is described herein, a method, including, in a network manager that communicates with a network including a plurality of network elements interconnected in a Cartesian topology, defining a first group of turns and a second group of turns in the topology, each turn in the first group and each turn in the second group includes an input hop from a previous network element to a current network element and an output hop from the current network element to a next network element. Based on the turns in the first and second groups, rules that when applied to packets traversing respective network elements, guarantee that no deadlock conditions occur in the network, are specified. The rules specified for a given network element include (i) forwarding rules from one or more input ports to one or more output ports so as to reach a given target coupled to the network without traversing any of the turns of the second group, and (ii) Virtual Lane (VL) modification rules for reassigning packets, which traverse turns of the first group and which are assigned to a first VL, to a different second VL. The given network element is configured with the rules.

There is additionally provided, in accordance with another embodiment that is described herein, a communication network that comprises a plurality of network elements interconnected in a Cartesian topology. The network elements are configured to forward packets in accordance with rules that when applied to packets traversing respective network elements, guarantee that no deadlock conditions occur in the network. The rules are specified based on a first group of turns and on a second group of turns in the Cartesian topology, each turn in the first group and each turn in the second group includes an input hop from a previous network element to a current network element and an output hop from the current network element to a next network element. The rules specified for a given network element include (i) forwarding rules from one or more input ports to one or more output ports so as to reach a given target coupled to the network without traversing any of the turns of the second group, and (ii) Virtual Lane (VL) modification rules for reassigning packets, which traverse turns of the first group and which are assigned to a first VL, to a different second VL.

There is additionally provided, in accordance with an embodiment that is described herein, a method for communication including, in a communication network that includes a plurality of network elements interconnected in a Cartesian topology, forwarding packets, by the network elements, in accordance with rules that when applied to packets traversing respective network elements, guarantee that no deadlock conditions occur in the network. The rules are specified based on a first group of turns and on a second group of turns in the Cartesian topology, each turn in the first group and each turn in the second group comprises an input hop from a previous network element to a current network element and an output hop from the current network element to a next network element. The rules specified for a given network element include (i) forwarding rules from one or more input ports to one or more output ports so as to reach a given target coupled to the network without traversing any of the turns of the second group, and (ii) Virtual Lane (VL) modification rules for reassigning packets, which traverse turns of the first group and which are assigned to a first VL, to a different second VL.

These and other embodiments will be more fully understood from the following detailed description of the embodiments thereof, taken together with the drawings in which:

BRIEF DESCRIPTION OF THE DRAWINGS

FIG. 1B is a block diagram that schematically illustrates a computing system in which network nodes communicate over a network having a Cartesian Three-Dimensional (3D) Mesh topology, in accordance with another embodiment that is described herein;

DETAILED DESCRIPTION OF EMBODIMENTS

Overview

Figure 1A:
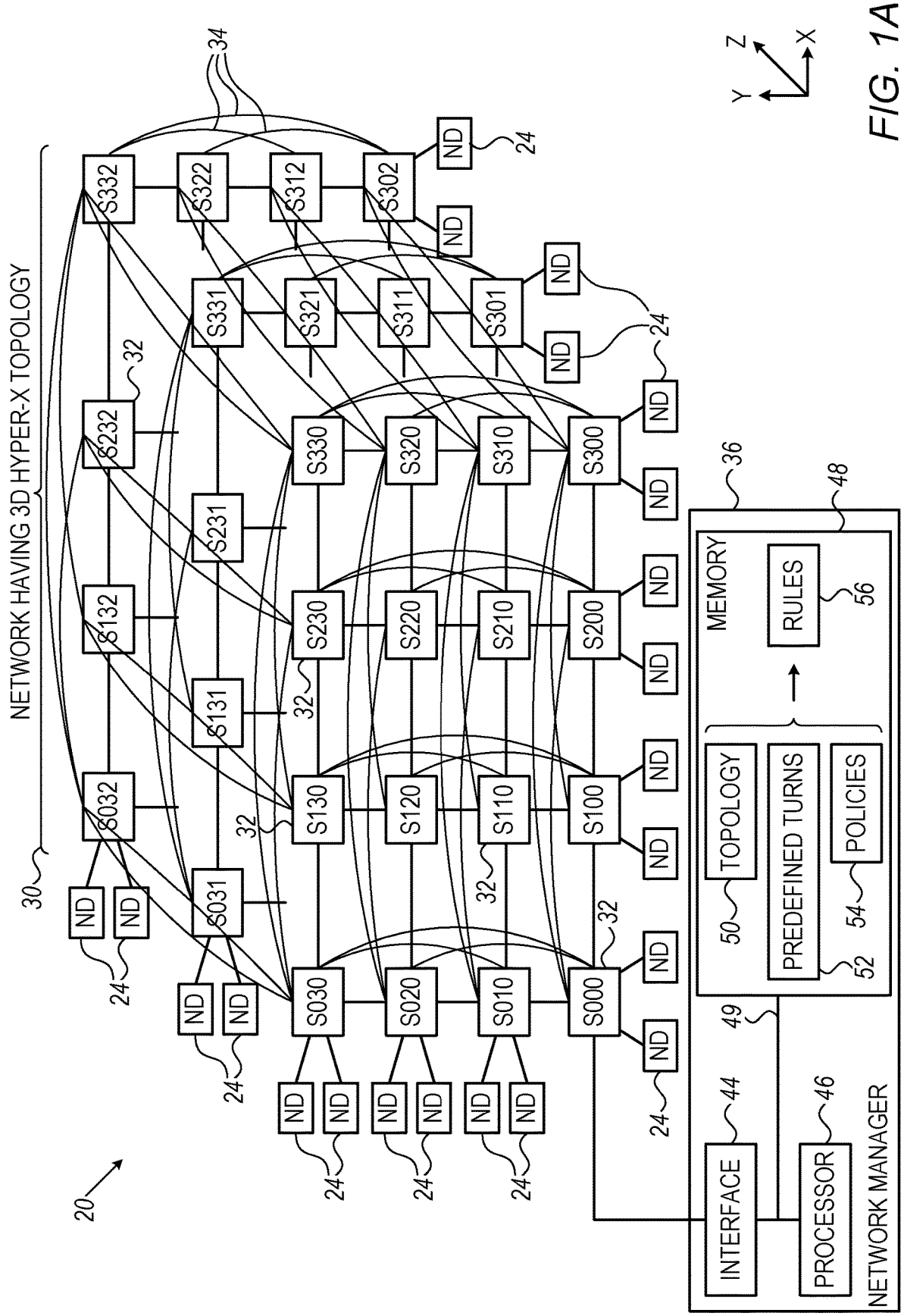
FIG. 1A is a block diagram that schematically illustrates a computing system in which network nodes communicate over a network having a Cartesian Three-Dimensional (3D) HyperX topology, in accordance with an embodiment that is described herein.

Packets traversing a communication network are typically buffered temporarily in switches along the route. In networks that employ lossless link-level flow control, a switch typically sends flow control notifications indicative of the switch buffer status to its previous-hop neighbor switch. The previous-hop switch throttles transmission of packets over the link in question based on these notifications. In some practical situations, the buffers of multiple switches interconnected cyclically become full, and consequently, these switches are unable to further send or receive packets. Such an undesired condition is referred to as a "deadlock condition" or simply "deadlock" for brevity.

In some networks, the switches are arranged in a Cartesian topology such as mesh, torus, hypercube, generalized hypercube or HyperX. Switches in a Cartesian topology are interconnected in a virtual grid and can be identified by respective Cartesian coordinates. A Cartesian topology may have any suitable dimensionality, such as one-dimensional (1D), two-dimensional (2D), three-dimensional (3D), or a higher dimensionality.

Embodiments that are described herein provide improved methods and systems for deadlock-free routing in networks having a Cartesian topology. In principle, a dependency loop may be broken to prevent deadlock by (i) preventing routing via at least one of the switches participating in the dependency loop, and (ii) modifying a VL of packets traversing one of the switches in the dependency loop. Restricting path usage in the network, however, reduces path diversity and routing flexibility, and may possibly exclude shortest paths among network elements. Moreover, using a large number of VLs requires large buffering storage space, which is expensive and not always available.

In the disclosed embodiments, deadlock free routing is guaranteed for Cartesian 3D topologies (and lower dimensionality) using only two VLs. Moreover, for certain topologies such as a Cartesian HyperX topology, shortest paths are guaranteed to be produced. For example, in a 3D HyperX topology, all paths up to a length of three hops (three is also the network diameter in this case) are guaranteed to be produced, which includes all shortest paths.

In some embodiments, a network-management computer, also referred to as a "network manager," connects to the network and is used for configuring the network switches.

To this end, the network manager defines multiple turn types in the Cartesian topology, wherein each turn traverses a first hop along a first dimension, successively followed by a second hop along a second dimension. The first and second dimensions may have same or different respective identities and the first and second hops may have the same of different directions. Each of the turn types is defined by the identities and directions of the first and second hops. Based on the turn types, the network manager specifies rules that are provisioned to the network elements to control packet forwarding and VL assignment to packets traversing the network, while avoiding deadlock conditions.

Consider an embodiment of an apparatus (e.g., a network manager), comprising a network interface and a processor. The network interface communicates with a network comprising a plurality of network elements interconnected in a Cartesian topology. The processor defines a first group of turns and a second group of turns in the topology, wherein each turn in the first group and each turn in the second group comprises an input hop from a previous network element to a current network element and an output hop from the current network element to a next network element. Based on the turns in the first and second groups, the processor specifies rules that when applied to packets traversing respective network elements, guarantee that no deadlock conditions occur in the network. The rules specified for a given network element comprise (i) forwarding rules from one or more input ports to one or more output ports so as to reach a given target coupled to the network without traversing any of the turns of the second group, and (ii) Virtual Lane (VL) modification rules for reassigning packets, which traverse turns of the first group and which are assigned to a first VL, to a different second VL. The processor configures the given network element with the specified rules.

In some embodiments, the processor identifies a given turn that occurs in traversing the given network element from an input port to an output port, and specifies at least one of the rules (i) depending on whether the given turn belongs to the first group, for packets assigned to the first VL and (ii) depending on whether the given turn belongs to the second group for packets assigned to the second VL.

In some embodiments, the processor refrains from modifying the VL of a packet assigned to the second VL, in which case only two VLs are used.

The processor may specify forwarding rules in various ways. For example, the processor may specify rules according to which all turns in the first and second groups are forbidden, independently on the packet VL. As another example, the processor may specify rules for packets assigned to the first VL, according to which the turns in the first groups are permitted, but when taken, the packet VL must increase to the second VL. In this example, the turns in the second group are forbidden to packets assigned to the second VL.

In some embodiments, to guarantee shortest paths, the processor specifies a forwarding rule that permits a turn from an input port to an output port only if traversing the turn reduces a number of remaining hops to the given target. Alternatively, the processor may specify a forwarding rule that permits a turn that does not reduce a number of remaining hops to the given target but that meets a specified total number of hops per path. This limits the maximal path length in the network.

In some embodiments, the only paths available from a network element to the target contain forbidden turns. This means that packets arriving the given switch and destined to the target cannot be further forwarded. To prevent such events, the processor checks possible paths to the target, and in response to detecting that a path from the given network element to the target must contain a turn that belongs to the second group, specifies a forwarding rule that forbids traversing the path.

The disclosed embodiments are applicable in Cartesian topologies, including Cartesian HyperX topologies. For a HyperX topology that comprises up to three dimensions, the processor may specify the rules, so as to guarantee at least one path of up to three hops between any pair of network elements in the network. Note that the processor may also produce longer paths.

In the disclosed techniques, rules that guarantee deadlock-free routing in a Cartesian topology are specified based on two groups of predefined turns. Turns in a first group are permitted for packets assigned to a first VL only if the VL is modified to the second VL. Turns in the second group are forbidden for packets assigned to the second group. In 3D or lower dimensionality topologies, the derived rules require using only two VLs thus saving buffering storage space. Moreover, in certain topologies such as the Cartesian HyperX topology, the derived rules result in high path diversity, and guarantee shortest paths between any two network elements in the network.

System Description

FIG. 1A is a block diagram that schematically illustrates a computing system 20 in which network nodes communicate over a network having a Cartesian Three-Dimensional (3D) HyperX topology, in accordance with an embodiment that is described herein.

Computing system 20 comprises multiple host computers 24 which communicate with one another over a network 30 and thus function as network nodes of the network. A network node 24 typically connects to network 30 via a respective Network Interface Controller (NIC), (not shown). In FIG. 1A, a network node is denoted "ND."

Network 30 (as well as network 31 of FIG. 1B that will be described below) may comprise any suitable communication network such as, for example, an InfiniBand (IB) switch fabric, or packet networks of other sorts, such as Ethernet or Internet Protocol (IP) networks. Alternatively, network 30 may operate in accordance with any other suitable standard or protocol.

Network 30 typically comprises multiple network elements 32, which are interconnected via physical links 34 in accordance with some predefined network topology. Network elements 32 may comprise, for example, switches, routers, bridges, gateways, or any other suitable type of network elements. In a fully connected Cartesian topology such as the HyperX topology depicted in FIG. 1A, each of network nodes 24 connects to a respective switch in the network using a physical link 34, and is able to communicate over the network with all other network nodes.

Network 30 may comprise one or more switches that are interconnected to other switches in the network but are not connected to any network node 24. In the example of FIG. 1A, each switch connects to two network nodes. In practice, however, each switch in a Cartesian topology may connect to any other suitable number of network nodes. Moreover, different switches may connect to different respective numbers of network nodes. In general, the number of network nodes is limited by the number of switch ports not used for connecting to other switches.

Switches in network 30 that connect to one another directly using a physical link 34 are referred to as "neighbor switches." A packet traversing from a given switch to a neighbor switch traverses one "hop" in the underlying topology. In a Cartesian topology, the switches are assigned Cartesian coordinates, which associate the switches with respective vertices on the underlying Cartesian grid. Each pair of vertices are separated along a given dimension in one grid unit (e.g., the grid unit equals the integer '1'). As an example, in a 3D Cartesian topology, a Cartesian coordinate may be specified by three integers (Cx,Cy,Cz). For example, the Cartesian coordinate (0,1,2) differs in one grid unit in the Y dimension, and in two grid units in the Z dimension, relative to the origin Cartesian coordinate (0,0,0). In a Cartesian topology, the Cartesian coordinates of two neighbor switches that are interconnected directly differ in one, and only one, of the topology dimensions by one or more grid units.

For example, the Cartesian coordinates of two neighbor switches in a mesh or hypercube topology differ by just one grid unit in one of the topology dimensions. In contrast, in torus, generalized hypercube and HyperX topologies, the Cartesian coordinates of two connected switches may differ in one grid unit or in multiple grid units in one of the topology dimensions. For example, in the HyperX topology, a switch at the origin coordinate (0,0,0) connects directly to a switch at coordinate (0,0,2) but does not connect directly to the switch at coordinate (0,1,1). In a Cartesian topology, the number of network elements per dimension may be common across all the dimensions, or alternatively, may vary among different dimensions.

In the description that follows, a "Cartesian coordinate" is also referred to simply as a "coordinate" for brevity.

The embodiments that will be described below are applicable to various Cartesian topologies, including mesh, torus, hypercube, generalized hypercube and HyperX. It is assumed that each of the switches in a D-dimensional Cartesian topology is associated with a D-dimensional coordinate of the underlying virtual grid. In a mesh topology the switches are arranged in a D-dimensional virtual grid, and each switch connects to its neighbor switches having nearest respective coordinates in the virtual grid. The structure of a torus topology is similar to that of the mesh topology, but unlike the mesh topology, the torus topology additionally includes cyclic connections between switches at the edges of the virtual grid. The hypercube topology is a type of a Cartesian mesh topology traversing only a single hop along each dimension. The generalized hypercube topology extends the torus topology by interconnecting all the switches along some axis rather than interconnecting only neighbor switches of nearest coordinates. In a Cartesian HyperX topology, each switch connects to all other switches in each of the D dimensions.

A route (or path) in a D-dimensional Cartesian topology traverses a sequence of one or more hops, wherein each hop traverses from a switch (or source node) to a successive switch (or destination node) along the route. Each hop traverses one of the topology dimensions, corresponding to the topology coordinate that changes between the two switches.

In the example of FIG. 1A, the switches of network 30 are arranged in a Cartesian 3D HyperX topology. In a Cartesian HyperX topology, each switch connects to all other switches along each dimension. In FIG. 1A, the switches are labeled with respective 3D coordinates along the X, Y and Z dimensions. In the present example, the Cartesian 3D HyperX topology comprises four switches along the X and Y dimensions and three switches along the Z dimension.

FIG. 1B is a block diagram that schematically illustrates a computing system 90 in which network nodes communicate over a network 31 having a Cartesian Three-Dimensional (3D) Mesh topology, in accordance with another embodiment that is described herein.

In the present example, network 31 comprises multiple switches 32 interconnected using physical links 34 in a 3D Cartesian grid, in accordance with a Mesh topology. In this example, the Mesh topology comprises three switches along each of the X and Y dimensions, and of two switches along the Z dimension. Network nodes 24 are coupled to switches 32 and may communicate with one another over the network.

The description above regarding computing system 20 of FIG. 1A is similarly applicable to computing system 90 of FIG. 1B.

The embodiments disclosed herein are applicable to both pristine networks in which all the switches (32) and physical links (34) on the virtual grid are present and function, as well as to faulty networks in which at least one switch or physical link is missing or failing.

Networks 30 and 31 are managed using a central network-management computer, referred to herein as a network manager 36. A block diagram depicting the details of an example network manager 36 is depicted in FIG. 1A but omitted from FIG. 1B, for clarity. The network manager comprises an interface 44 for connecting to the relevant network 30 or 31, and a processor 46 coupled to interface 44 and to a memory 48 via a bus 49, e.g., a Peripheral Component Interconnect Express (PCIe) bus or any other suitable bus). In some other embodiments, network manager 36 may be running atop one of the network nodes 24. The network manager enables a network administrator to setup the network and provision the network elements with routing information via interface 44. Alternatively, at least part of the provisioning is carried out by the network manager automatically.

In some embodiments, network manager 36 is aware of the underlying network topology, i.e., the identities of the network elements and the manner in which they are interconnected, e.g., as configured manually by a network administrator via a suitable interface (not shown). Alternatively or additionally, the network manager learns the network topology automatically by interrogating network elements 32.

Among other tasks, network manager 36 specifies routes between pairs of the network elements, based on the network topology, and configures relevant routing information to the network elements belonging to these routes.

In some embodiments, network manager 36 represents the underlying topology in memory 48 as a topology 50, comprising a group of switch coordinates and connections among them. In some embodiments, to control packet forwarding and VL usage, the network manager defines multiple types of turns 52 in topology 50, wherein each turn traverses two consecutive hops. Based on the defined turns, the network manager specifies rules 56 to be applied within respective switches for preventing deadlock conditions. The network manager may also store one or more policies 54 specifying additional restrictions on allowed paths, e.g., the maximal number of hops per path. The network manager configures the switches in the network, e.g., via interface 44, in accordance with rules 56.

Although in computing system 20 of FIG. 1A and in computing system 90 of FIG. 1B network manager 36 is implemented on a dedicated network node, in alternative embodiments, the network manager can be implemented within one of network nodes 24, and its functionality executed by a processor of the network node. Further alternatively, at least one of the switches in the network may comprise a "managed switch" attached to a processor, and the network manager (or part thereof) may reside on the managed switch.

Network Element Structure and Functionality

Figure 2:
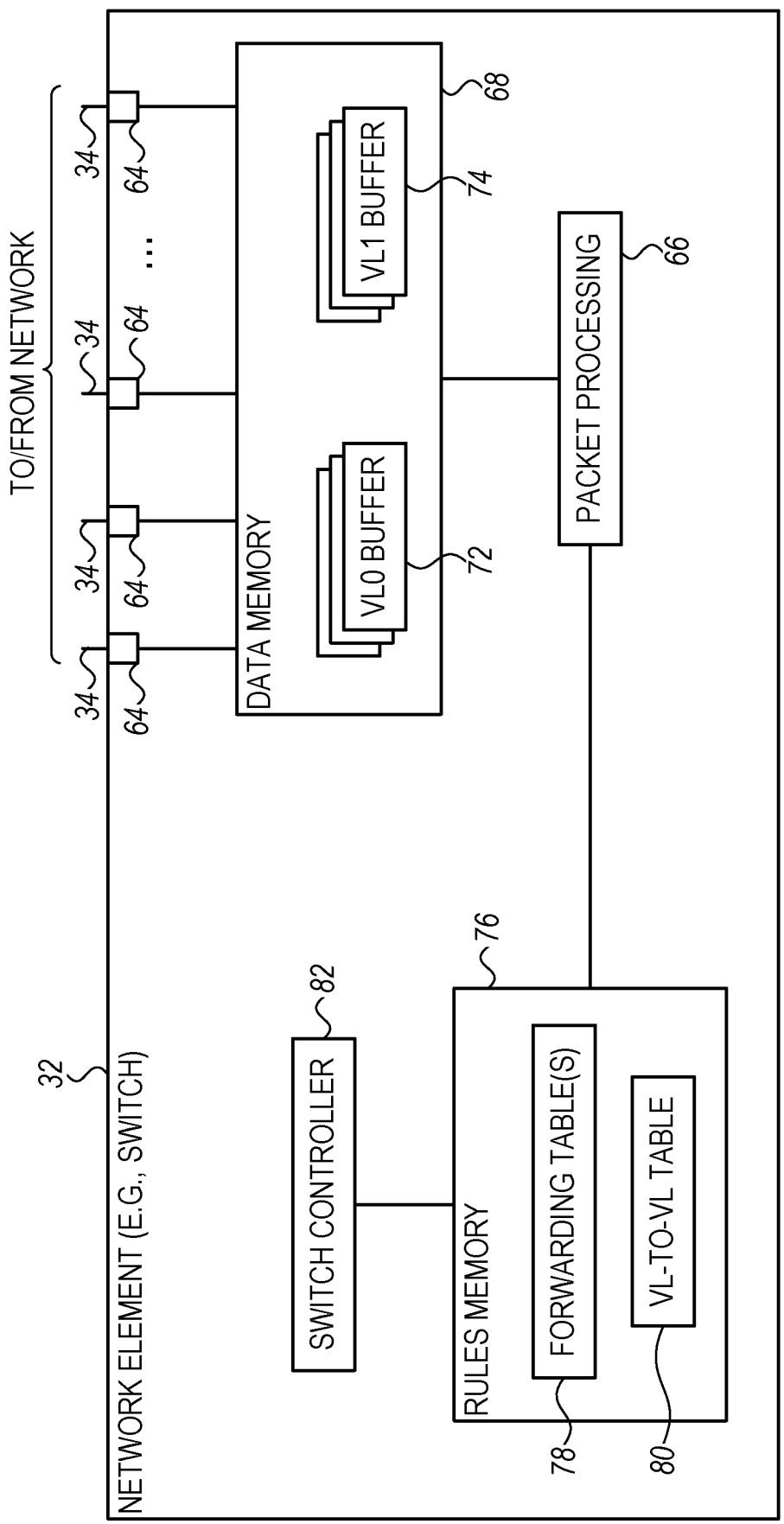
FIG. 2 is a block diagram that schematically illustrates a network switch, in accordance with an embodiment that is described herein.

FIG. 2 is a block diagram that schematically illustrates a network switch 32, in accordance with an embodiment that is described herein. Although the description that follows refers mainly to a network switch, the disclosed techniques can be used with various other types of network elements such as routers, for example.

The description of FIG. 2 refers mainly to switch 32 in network 30 of FIG. 1A, but is applicable similarly to switch 32 in network 31 of FIG. 1B.

Switch 32 comprises multiple ports 64 for exchanging data packets with network 30 via physical links 34. In some embodiments, a given port 64 can function as an ingress interface for incoming packets or as an egress interface for outgoing packets. Alternatively, a port 64 can function as both ingress and egress interfaces.

Packets traversing the network may belong to different flows. In some embodiments, physical links 34 in network 30 are each shared by multiple logical communication links, also referred to as virtual channels. In InfiniBand, the virtual channels are also referred to as Virtual Lanes (VLs).

In the present example embodiment, switch 32 comprises packet processing circuitry 66 coupled to a data memory 68, which comprises VL0 buffers 72 and VL1 buffers 74 allocated for storing packets arriving from the network via the ingress interfaces of ports 64. The VL0 buffers and VL1 buffers are also referred to as "virtual buffers." The received packets are assigned to VL0 or to VL1 and are stored in the virtual buffers in accordance with a corresponding VL value carried in a header of the packets. In an embodiment, the switch stores in a same VL0 or VL1 buffer, packets that were received via a common port and that belong to one or more different flows.

In an embodiment, switch 32 receives, via a port 64, packets assigned to an input VL value denoted "VL0", and replaces this input VL value in the packets headers with a different output VL value denoted "VL1" before transmitting the packets back to the network via one of the egress interfaces of ports 64. In some embodiments, the mapping from an input VL value to an output VL value is part of the routing information (e.g., rules 56) provisioned to the switch by the network manager. In some of the embodiments disclosed below, changing the VL value assigned to a packet traversing the switch is used for preventing deadlock conditions in networks having a Cartesian topology. In some embodiments, based on provisioned rules specifying VL modification information, a switch decides to modify the VL of a packet received from VL0 to VL1 for certain types of turns formed by the two hops intermediated by that switch.

In the example switch 32, packet processing circuitry 66 is also coupled to a memory 76, which stores forwarding rules for forwarding packets between ports 64 and VL modification rules specifying conditions for VL modification. In the present example, the forwarding rules are implemented in one or more forwarding tables 78, and the VL modification rules are implemented in a VL-to-VL table 80. In alternative embodiments, the rules may be implemented in the switch using any other suitable method.

Typically, each packet belongs to a certain flow. By routing a certain flow to a certain port based on the configured forwarding rules, the switch causes the packets of that flow to be routed over a certain routing path through the underlying network, e.g., network 30.

In the context of the present patent application and in the claims, the term "packet" is used to describe the basic data unit that is routed through the network. Different network types and communication protocols use different terms for such data units, e.g., packets, frames, or cells. All these data units are regarded herein as packets.

Switch 32 comprises a switch controller 82, which configures the rules in rules memory 76 to apply a desired routing plan. By controlling the routing plan, switch 32 is able to cause the packets to traverse various routing paths through the underlying network, e.g., network 30.

In some embodiments, switch 32 supports adaptive routing by allowing packets received in a given ingress interface to be routed via one of multiple egress interfaces. The mapping from an ingress port to one or more egress ports is configured in forwarding tables 78. To re-route a given flow, switch controller 82 selects for the flow packets, which the switch receives via an ingress interface, a different egress interface. Alternatively, switch 32 may hold a set of routing rules, e.g., per flow. In some cases, the packets are routed without recording any information for future use.

In some embodiments, forwarding the packets is based on certain fields in the packet headers. The fields may include, for example, at least one of the source address and destination address, the underlying protocol and the source and destination port numbers. In some embodiments, forwarding the packets comprises calculating a hash function over one or more fields in the packet headers, and using the result hash value for selecting a respective egress interface for the packet.

The configurations of computing system 20 and network manager 36 in FIG. 1A, computing system 90 in FIG. 1B and switch 32 in FIG. 2 are example configurations, which are chosen purely for the sake of conceptual clarity. In alternative embodiments, any other suitable configurations can also be used. The different elements of network manager 36 and switch 32 may be implemented in hardware, such as using one or more Application-Specific Integrated Circuits (ASICs) or Field-Programmable Gate Arrays (FPGAs). In alternative embodiments, some elements of network manager 36 and/or switch 32, e.g., processor 46 and/or switch controller 82, may be implemented in software executing on a suitable processor, or using a combination of hardware and software elements.

Elements that are not necessary for understanding the principles of the present application, such as various interfaces, addressing circuits, timing and sequencing circuits and debugging circuits, have been omitted from FIGS. 1A, 1B and 2 for clarity.

In some embodiments, processor 46 and/or switch controller 82 may comprise general-purpose processors, which are programmed in software to carry out the network manager and/or switch functions described herein. The software may be downloaded to the processors in electronic form, over a network, for example, or it may, alternatively or additionally, be provided and/or stored on non-transitory tangible media, such as magnetic, optical, or electronic memory.

Routing and Deadlock Prevention in Cartesian Topologies

As noted above, a path between two neighbor switches that are directly connected to one another in some topology, e.g., in a Cartesian topology, is also referred to herein as a "hop." A path from a given switch to any other switch in the underlying topology may comprise one or more hops. In a Cartesian topology, a packet may traverse switches only along the underlying Cartesian grid. This means that no diagonal paths are allowed.

In some embodiments, each hop in a Cartesian topology is associate with a dimension and with a sign attribute. The sign of a hop is referred to as "positive" when the hop traverses to a higher coordinate value in the traversed dimension. Similarly, the sign of a hop is referred to as "negative" when the hop traverses to a lower coordinate value in the traversed dimension.

As noted above, in some embodiments, network manager 36 defines multiple types of turns (52) in the Cartesian topology. Each turn traverses a first hop along a first dimension in a first direction (positive or negative), successively followed by a second hop along a second dimension in a second direction. Each of the turn types may be defined by the identities of the first and second dimensions and by the directions (e.g., sign attributes) of the first and second hops. The first and second hops of a turn are also referred to herein as "input hop, and "output hop" respectively. The sequence comprising the input hop followed by the output hop thus form a corresponding turn in the Cartesian topology. For example, a turn traversing an input hop in a positive direction in the Y dimension followed by an output hop in a negative direction in the X dimension is denoted "+Y to −X."

Consider now the Cartesian 3D HyperX topology in FIG. 1A in which the three dimensions are specified in three respective dimensions denoted X, Y and Z. In the present example, each of the X and Y dimensions comprises four switches, and the Z dimension comprises three switches. Each switch 32 in the Cartesian topology is identified by a Cartesian 3D coordinate comprising coordinate values denoted (Cx,Cy,Cz), in respective ranges (0 . . . 3), (0 . . . 3) and (0 . . . 2). For example, a switch positioned at the origin coordinate Cx=Cy=Cz=0 is denoted "S000", and a switch in a coordinate Cx=3, Cy=2 and Cz=1 is denoted "S321."

In the 3D HyperX topology of FIG. 1A, each switch connects directly to all other switches along each of the X, Y and Z dimensions, using respective physical links 34. For example, switch S110 connects directly to switches S010, S210 and S310 along the X dimension, to switches S100, S120 and S130 along the Y dimension, and to S111 and S112 along the Z dimension.

In the Cartesian 3D HyperX topology, the shortest path between switches whose 3D coordinates differ in one, two or three dimensions comprise a single hop path, a two-hop path, and a three-hop path, respectively. Note that a shortest path is not necessarily unique. For example, a two-hop path from S110 to S230 may traverse an intermediate switch S210 or S130.

Next are considered conditions for creating deadlock in a Cartesian topology. The conditions will be specified using certain types of turns in the topology, depending on the dimensions and sign attributes of the two hops comprising the turns. For convenience, the conditions for deadlock are discussed for a Cartesian 3D topology.

In defining the turn types the following hop notations are used: A hop having a positive sign attribute in the X, Y or Z dimension is denoted +X, +Y or +Z, respectively. A hop having a negative sign attribute in the X, Y or Z dimension is denoted −X, −Y or −Z, respectively. A hop having a positive or negative sign attribute in the X, Y or Z dimension is denoted ±X, ±Y or ±Z, respectively.

A dependency loop comprises a cyclic sequence of turns traversed by one or mode flows. A deadlock condition occurs when the buffers of the switches involved in a dependency loop become full, thus preventing further packet transmission from any of these switches. A deadlock condition may be prevented by (i) forbidding traversing at least one of the turns in the dependency loop by any flow in the network, or (ii) modifying the VL value assigned to packets traversing one of the turns in the dependency loop.

Without VL modification, a cyclic path may be formed by traversing two hops of opposite directions along each of the dimensions. In a single dimension e.g., the X dimension, a dependency loop may occur in a path that includes at least one turn from −X to +X and another turn from +X to −X. Therefore, it is sufficient to prevent all −X to X, −Y to Y and −Z to Z turns when the VL value remains unmodified.

In two dimensions, e.g., X and Y, a dependency loop may occur in a path that includes (i) at least one turn from ±Y to ±X and another turn from −X to ±Y, or (ii) at least one turn from ±X to +Y and another turn from −Y to ±X.

Preventing deadlock in two and three dimensions is described herein.

Figure 3:
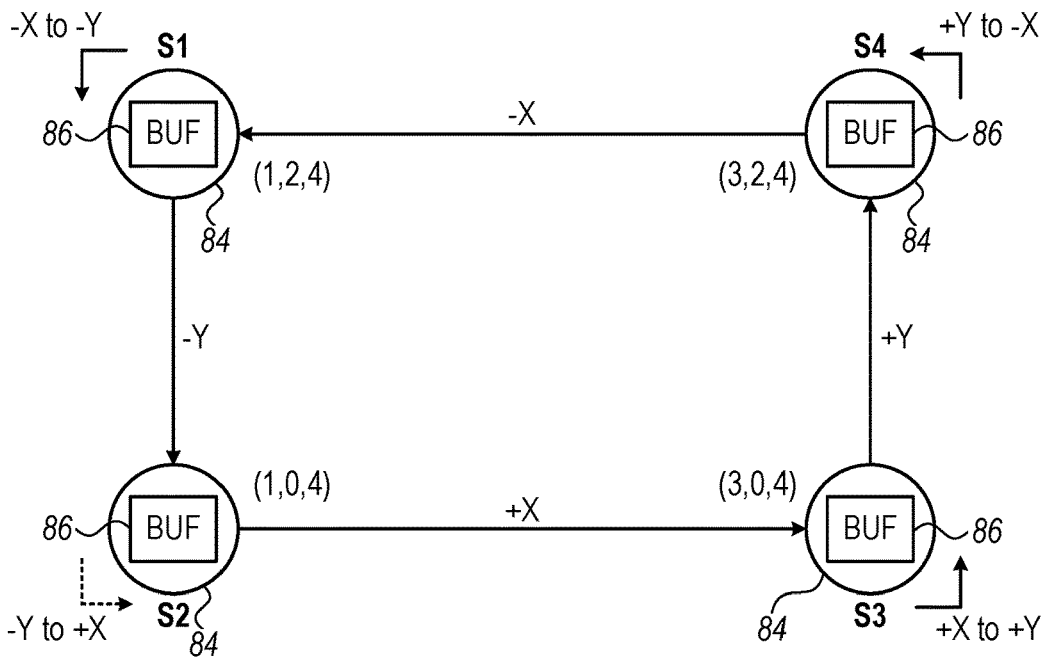
FIG. 3 is a diagram that schematically illustrates a dependency loop across two dimensions, in accordance with an embodiment that is described herein.

FIG. 3 is a diagram that schematically illustrates a dependency loop across two dimensions, in accordance with an embodiment that is described herein. FIG. 3 depicts switches 84 denoted S1 . . . S4 in a network having a Cartesian 3D topology. Each of switches 84 comprises a buffer 86 for storing packets received from a buffer of a previous switch and for sending the packets to a buffer 86 of a subsequent switch. The cyclic path S1→S2→S3→S4→S1 forms a dependency loop over dimensions X and Y.

In FIG. 3, switches S1, S2, S3 and S4 are assigned respective coordinates as depicted in Table 1.

TABLE 1

| Coordinates assigned to switches in FIG. 3 | | | | |
|---|---|---|---|---|
| SW/Coordinates | Cx | Cy | Cz | Change |
| S1 | 1 | 2 | 4 | |
| S2 | 1 | 0 | 4 | −Y |
| S3 | 3 | 0 | 4 | +X |
| S4 | 3 | 2 | 4 | +Y |
| S1 | 1 | 2 | 4 | −X |

As shown in FIG. 3, the path from S1 to S3 via S2 creates a turn from −Y to +X, the path from S2 to S4 via S3 creates a turn from +X to +Y, the path from S3 to S1 via S4 creates a turn from +Y to −X, and the path from S4 to S2 via S1 creates a turn from −X to −Y.

When buffers 86 of S1 . . . S4 are all assigned to a common VL, the dependency loop may be broken by network manager 36 specifying a rule that forbids one of the turns, e.g., −Y to +X depicted in a dotted line. Alternatively, all the turns are allowed, but the network manager specifies a rule that forces VL modification from VL0 to VL1 within one of the turns, for example, the turn from −Y to +X.

In some embodiments, network manager 36 specifies a first group of turns to be applied to packets assigned to VL0 and a second group of turns to be applied to packets assigned to VL1. The first group specify turns in which the packet VL must be modified from VL0 to VL1. The second group specifies turns that are forbidden for packets assigned to VL1.

In some embodiments, the first and second groups of turns from which are derived rules that prevent deadlock conditions across any pair of dimensions are given by: first group turns—(±Y to +X), (±Z to +X) and (±Z to +Y), and second group turns—(−Y to ±X), (−Z to ±X) and (−Z to ±Y).

Figure 4:
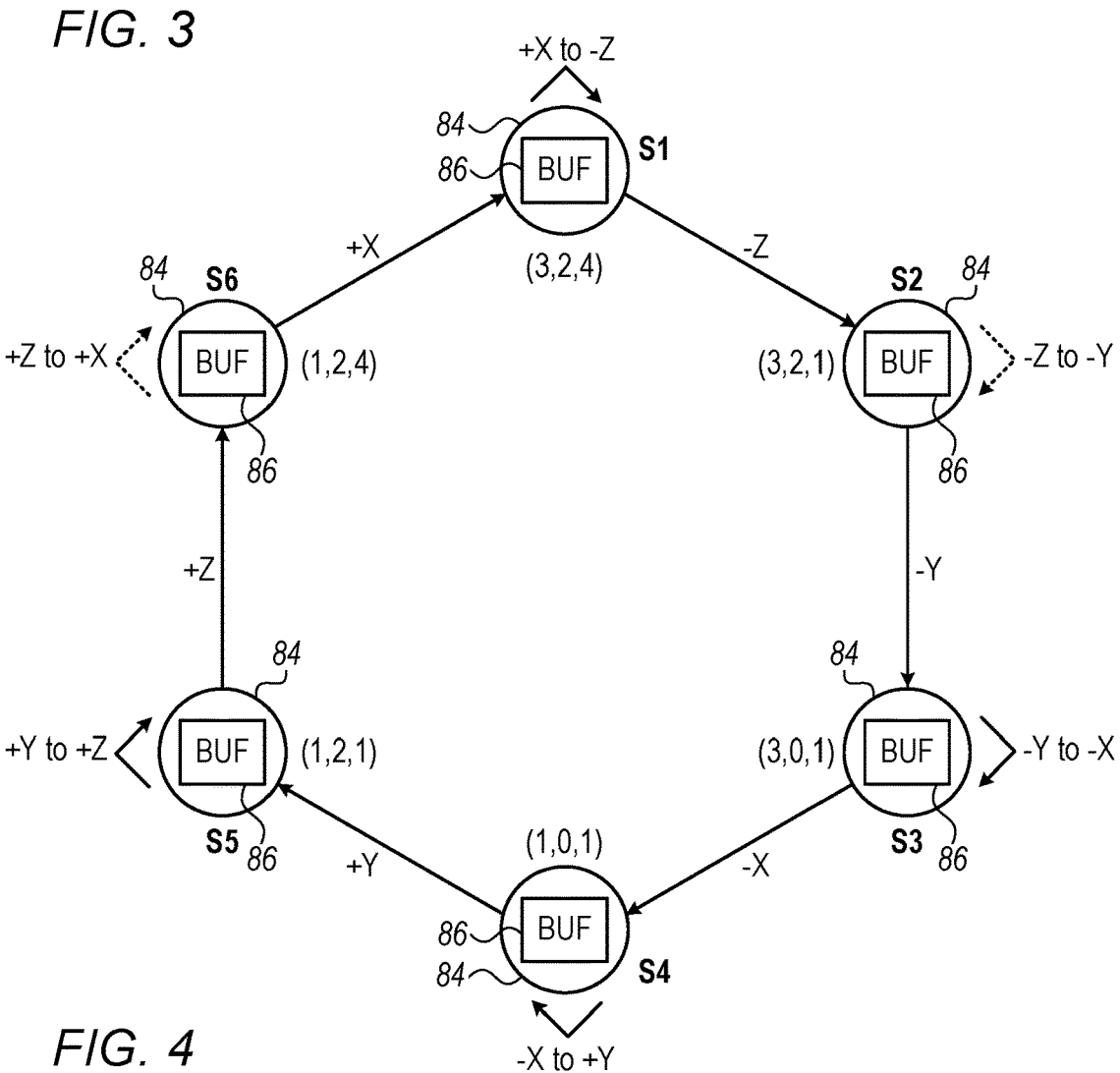
FIG. 4 is a diagram that schematically illustrates a dependency loop across three dimensions, in accordance with an embodiment that is described herein.

FIG. 4 is a diagram that schematically illustrates a dependency loop across three dimensions, in accordance with an embodiment that is described herein.

FIG. 4 depicts switches 84 denoted S1 . . . S6, which belong to a network having a Cartesian 3D topology. Each of switches 84 comprises a buffer 86 for storing packets received from a buffer of a previous switch and for sending the packets to a buffer of a subsequent switch. The cyclic path S1→S2→S3→S4→S5→S6→S1 forms a dependency loop over the dimensions X, Y and Z.

In FIG. 4, switches S1 . . . S6 are assigned respective coordinates as given in Table 2.

TABLE 2

Coordinates assigned to switches in FIG. 4

| SW/Coordinates | Cx | Cy | Cz | Change |
|---|---|---|---|---|
| S1 | 3 | 2 | 4 | |
| S2 | 3 | 2 | 1 | −Z |
| S3 | 3 | 0 | 1 | −Y |
| S4 | 1 | 0 | 1 | −X |
| S5 | 1 | 2 | 1 | +Y |
| S6 | 1 | 2 | 4 | +Z |
| S1 | 3 | 2 | 4 | +X |

As shown in FIG. 4, the path from S1 to S3 via S2 creates a turn from −Z to −Y, the path from S2 to S4 via S3 creates a turn from −Y to −X, the path from S3 to S5 via S4 creates a turn from −X to +Y, the path from S4 to S6 via S5 creates a turn from +Y to +Z, and the path from S5 to S1 via S6 creates a turn from +Z to +X.

When buffers 86 of S1 . . . S6 are all assigned to a common VL, the dependency loop may be broken by the network manager specifying a rule that forbids one of the turns in VL0, e.g., +Z to +X. This turn is allowed, however, if the VL is modified to VL1. As another example, to break the dependency loop, a turn may be allowed in VL0 but forbidden in VL1, e.g., −Z to −Y.

In some embodiments, the first and second groups of turns from which are derived rules that prevent deadlock conditions across three dimensions are given by: first group—(±Y to +X), (±Z to +X) and (±Z to +Y), and second group—(−Y to ±X), (−Z to ±X) and (−Z to ±Y).

Table 3 summarizes the types of turns specified for a 3D Cartesian topology in the first and second groups of turns, in an embodiment.

TABLE 3

Turns specified for a 3D Cartesian topology in first and second groups of turns.

| Turns in first group | | Turns in second group | |
|---|---|---|---|
| Input-hop | Output-hop | Input-hop | Output-hop |
| ±Y | +X | −Y | ±X |
| ±Z | +X | −Z | ±X |
| ±Z | +Y | −Z | ±Y |
| −X | +X | −X | +X |
| −Y | +Y | −Y | +Y |
| −Z | +Z | −Z | +Z |

Methods for Specifying Forwarding Rules and VL Modification Rules

In some embodiments, for preventing deadlock conditions in a network having a Cartesian topology, the processor specifies rules to be applied to packets assigned to VL0 based on turns belonging to a first group of turns, and specifies rules to be applied to packets assigned to VL1 based on turns specified in a second group of turns. In an example embodiment, the network comprises a 3D Cartesian topology, in which case the turns in the first and second group may be specified as given in Table 3 above.

Figure 5:
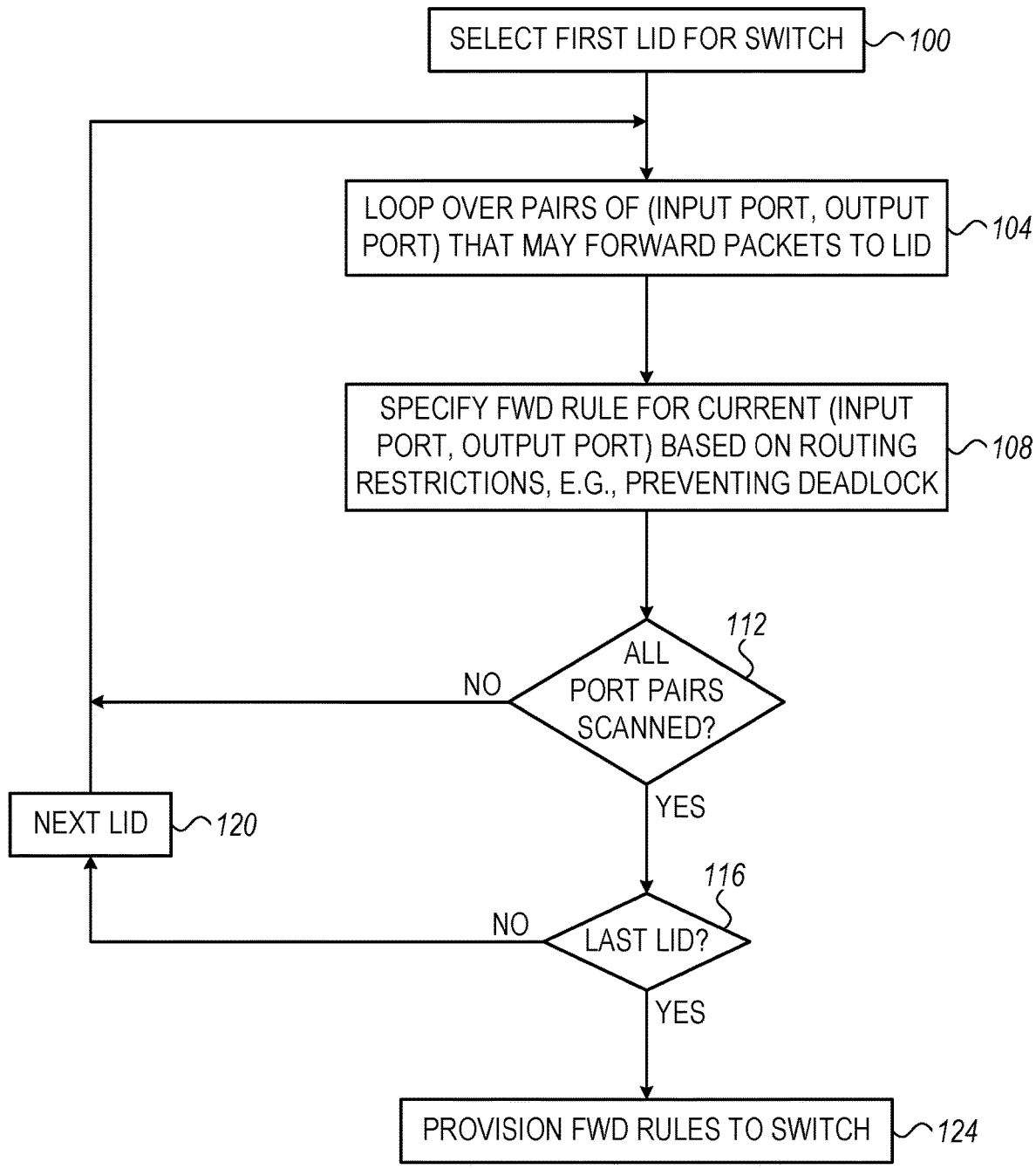
FIG. 5 is a flow chart that schematically illustrates a method for specifying forwarding rules for a switch in a network having a Cartesian topology, in accordance with an embodiment that is described herein.

FIG. 5 is a flow chart that schematically illustrates a method for specifying forwarding rules for a switch in a network having a Cartesian topology, in accordance with an embodiment that is described herein.

The method will be described as executed by processor 46 of network manager 36 for specifying forwarding rules to be provisioned to a switch 32 in network 30 of FIG. 1A. The method is similarly applicable to switch 32 in other suitable networks such as network 31 of FIG. 1B. It is further assumed that each network node 24 has a unique address or a Local Identifier (LID) assigned, e.g., by the network manager. Although the method will be described for a single switch 32, in practice the method is typically applied to multiple switches 32 in network 30, e.g., to all or part of switches 32.

The method begins with processor 46 selecting a first LID, at a first LID selection step 100. The first LID may be any of the LIDs respectively assigned to network nodes 24.

At a port scanning step 104, the processor manages scanning all pairs of (input port, output port) in the underlying switch that may forward packets received via the input port to the current LID via the output port. At a rule specification step 108, the processor specifies a forwarding rule (or multiple forwarding rules) for the current pair of input port and output ports, based on certain routing restrictions. Example rules are given herein, for a given turn from an input hop to an output hop via the underlying switch:

For packets assigned to VL0 and when detecting that the given turn belongs to the first group, the processor specifies a forwarding rule that forbids the given turn.

For packets assigned to VL0 and when detecting that the given turn belongs to the first group, the processor specifies a forwarding rule that permits the given turn, and specifies a VL modification rule corresponding to the given turn when permitted, for modifying the VL of the packet from VL0 to VL1.

For packets assigned to VL1 and when detecting that the given turn belongs to the second group, the processor specifies a rule that forbids the given turn.

For packets assigned to VL1, the processor specifies a rule for retaining the VL1 value unmodified.

At a port loop termination step 112, the processor checks whether all of the input-output port pairs in the switch have been scanned, and if not, loops back to step 104 to select a subsequent pair of input and output ports. Otherwise, the processor proceeds to a LID loop termination step 116 to check whether all LIDs in the network have been checked. When at step 116 there are LIDs that have not yet considered, the processor selects one of these LIDs at a next LID selection step 120 and loops back to step 104.

When at step 116 all LIDs have been processed, the processor proceeds to a provisioning step 124 to provision the specified rules to the switch. Following step 124 the method terminates.

As noted above, in some embodiments, rules that are specified based on the turns in the first group, which are permitted, comprise VL modification rules. In this embodiment, for a packet traversing via the switch a turn belonging to the first group, the rules specify modifying the VL to VL1.

In some embodiments, the forwarding rules are implemented within the switch using a forwarding table. In such embodiments, a forwarding rule specified for a permitted turn from an input port to an output port associates the output port with the input port in the forwarding table. Typically, multiple output ports may be associated with a single input port, thus supporting multiple possible paths to the target. This may be useful for adaptive routing and/or for bypassing a failing link. In an embodiment, a forwarding rule that forbids a given turn is implemented by omitting an association between the output port and input port in question.

In some embodiments, the VL modification rules are implemented in the switch in a VL-to-VL table. In such embodiments, the VL-to-VL table contains turns that when traversed by a packet assigned to VL0, the switch modifies the packet VL value to VL1.

Rules Based on Other Policies

The rules described above were specified mainly for preventing deadlock conditions in the network. In some embodiments, additional constraints may be imposed via policies 54. For example, in various applications the length of the path from a source node to a destination plays an important factor and should therefore be limited.

In a Cartesian topology, the distance from a first switch to a second switch may be specified as the number of hops traversed from the first switch to the second switch. A turn taken via a given switch may cause the remaining number of hops (e.g., the distance) to the target to decrease, remain unmodified or increase.

The distance to the target decreases when a coordinate element that is different in one of the dimensions changes to become equal to the corresponding coordinate element of the target, e.g., traversing from [1,1,1] to [1,1,3] when the destination coordinate is [1,2,3]. The distance to the target remains unmodified when the coordinate element that changes is different and remains different from the corresponding coordinate element of the target, e.g., traversing from [1,1,1] to [1,4,1] when the target coordinate is [1,2,3]. The distance to the target increases when the coordinate element that changes is already equal to the corresponding coordinate element of the target, e.g., traversing from [1,1,1] to [3,1,1] when the target coordinate is [1,2,3].

In some embodiments, the processor specifies a forwarding rule based on a policy that permits only turns that result in reducing the distance to the target. In such embodiments, the processor specifies a forwarding rule that permits a turn from an input port to an output port only when traversing the turn reduces the number of remaining hops to the given target.

In some embodiments, the processor specifies a forwarding rule based on a policy that permits turns that result in increasing the distance to the target or retaining the distance to the target unmodified, but that limits the total path length to the target. In such embodiments, the processor specifies a forwarding rule that permits a turn that does not reduce the number of remaining hops to the given target but that meets a specified total number of hops per path.

In some embodiments, to limit the path length, the processor specifies a rule that permits only a predefined number of turns that do not result in reducing the length to the target. For example, a rule that permits a turn that does not reduce the number of hops to the target only at selected switches such as a switch coupled directly to the source node, and/or a switch that is at a distance of one hop from the switch coupled to the target node.

Limiting the total path length reduces path latency and forces path convergence. For example, consider a switch at a coordinate (2, 1, 3) of a 3D HyperX topology, wherein the switch is positioned one hop away from a target switch at a coordinate (2,5,3). When the path length is unconstrained, the network manager may produce a nonconverging path that goes around the target switch along the second dimension. An example nonconverging path of this sort is given by: (2,1,3)→(2,2,3)→(2,4,3)→(2,3,3) and so on.

In some embodiments, each of the paths available from a given switch to a target switch contains a turn belonging to the second group of turns, which is forbidden for packets assigned to VL1 (for preventing deadlock). In an embodiment, in response to detecting that a path from a given switch to the target must contain a turn that belongs to the second group, the processor specifies a forwarding rule that forbids traversing the path.

In some embodiments, the network comprises a Cartesian HyperX topology having up to three dimensions, i.e., a 1D, 2D 3D topology. In such embodiments, the processor is configured to specify the rules, so as to guarantee, between any pair of network elements in the network, at least one path of up to three hops.

The embodiments described above are given by way of example and other suitable embodiments can also be used. For example, the turns given in Table 3 above are example turns, and other suitable turns can also be used. For example, in Table 3 the turns are specified for a 3D topology over first, second and third dimensions denoted X, Y and Z. In alternative embodiments, other assignments of the three dimensions to the symbols X, Y, and Z can also be used.

In some embodiments, other turns resulting in stricter rules can also be used. For example, the turn −X to +X may be replaced with a turn −X to ±X or with a turn ±X to ±X. (similar replacement turns can be specified for the Y and Z dimensions.) In such embodiments, the processor of the network management specifies a rule that forbids a turn comprising two consecutive hops along the same dimension. This may be useful in avoiding nonconverging paths. Using turns from which stricter rules are derived may be useful in switches having limited storage space for storing the rules, e.g., in a forwarding table.

The turns in Table 3 are specified for 3D topologies, but other suitable turns for 2D and 1D Cartesian topologies can also be specified. In an example embodiment, in a Cartesian 2D topology, the first group comprises the turns ±Y to +X, −X to +X and −Y to +Y and the second group comprises the turns −Y to ±X, −X to +X and −Y to +Y. For the 1D topology, each of the first and second groups comprises a single turn −X to +X.

Note that a 2D HyperX topology may be viewed as a 3D HyperX topology in which one of the dimensions (e.g., Z) has a size 1. Therefore, turns specified in the 3D topology and that involve the missing dimension may be ignored, in an embodiment.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a network interface, to communicate with a network comprising a plurality of network elements interconnected in a Cartesian topology; and
a processor to:
define a first group of turns and a second group of turns in the topology, wherein each turn in the first group and each turn in the second group comprises an input hop from a previous network element to a current network element and an output hop from the current network element to a next network element,
wherein the turns belonging to the first group are permitted for packets that (i) are initially assigned to a first Virtual Lane (VL) and (ii) are reassigned upon traversing a network element in the network to a different second VL,
and wherein the turns belonging to the second group are forbidden for packets assigned to the second VL;
based on the turns in the first and second groups, specify rules that when applied to packets traversing respective network elements, guarantee that no deadlock conditions occur in the network,
wherein the rules specified for a given network element comprise (i) forwarding rules from one or more input ports to one or more output ports so that packets received in the given network element and are assigned to the second VL reach a given target coupled to the network without traversing any of the turns of the second group, and (ii) VL modification rules for reassigning packets, which traverse turns of the first group and which are assigned to the first VL, to the second VL; and
configure the given network element with the rules.

2. The apparatus according to claim 1, wherein the processor is configured to identify a given turn that occurs in traversing the given network element from an input port to an output port, and to specify at least one of the rules (i) depending on whether the given turn belongs to the first group, for packets assigned to the first VL and (ii) depending on whether the given turn belongs to the second group for packets assigned to the second VL.

3. The apparatus according to claim 2, wherein the processor is configured to specify a forwarding rule that forbids the given turn, in response to detecting that the given turn belongs to the second group.

4. The apparatus according to claim 2, wherein the processor is configured to specify a forwarding rule that forbids the given turn, in response to detecting that a packet traversing the given turn belongs to the first group.

5. The apparatus according to claim 2, wherein the processor is configured to, in response to detecting that the given turn belongs to the first group, specify (i) a forwarding rule that permits the given turn and (ii) a corresponding VL modification rule that modifies the VL in the packet to the second VL.

6. The apparatus according to claim 1, wherein the processor is configured to specify a forwarding rule that permits a turn from an input port to an output port only when traversing the turn reduces a number of remaining hops to the given target.

7. The apparatus according to claim 1, wherein the processor is configured to specify a forwarding rule that permits a turn that does not reduce a number of remaining hops to the given target but that meets a specified total number of hops per path.

8. The apparatus according to claim 1, wherein the processor is configured to, in response to detecting that a path from the given network element to the target must contain a turn that belongs to the second group, specify a forwarding rule that forbids traversing the path.

9. The apparatus according to claim 1, wherein the Cartesian topology comprises a Cartesian topology selected from a list of Cartesian topologies comprising Mesh, Torus, Hypercube, generalized Hypercube and HyperX topologies.

10. The apparatus according to claim 1, wherein the Cartesian topology comprises a Cartesian HyperX topology having up to three dimensions, and wherein the processor is configured to specify the rules, so as to guarantee between any pair of network elements in the network, at least one path of up to three hops.

11. The apparatus according to claim 1, wherein the processor is configured to specify a VL modification rule that refrains from modifying the VL of a packet assigned to the second VL.

12. A method, comprising:
in a network manager that communicates with a network comprising a plurality of network elements interconnected in a Cartesian topology, defining a first group of turns and a second group of turns in the topology, wherein each turn in the first group and each turn in the second group comprises an input hop from a previous network element to a current network element and an output hop from the current network element to a next network element,
wherein the turns belonging to the first group are permitted for packets that (i) are initially assigned to a first Virtual Lane (VL) and (ii) are reassigned upon traversing a network element in the network to a different second VL,
and wherein the turns belonging to the second group are forbidden for packets assigned to the second VL;
based on the turns in the first and second groups, specifying rules that when applied to packets traversing respective network elements, guarantee that no deadlock conditions occur in the network, wherein the rules specified for a given network element comprise (i) forwarding rules from one or more input ports to one or more output ports so that packets received in the given network element and are assigned to the second VL reach a given target coupled to the network without traversing any of the turns of the second group, and (ii) VL modification rules for reassigning packets, which traverse turns of the first group and which are assigned to the first VL, to the second VL; and configuring the given network element with the rules.

13. The method according to claim 12, wherein specifying the rules comprises identifying a given turn that occurs in traversing the given network element from an input port to an output port, and specifying at least one of the rules (i) depending on whether the given turn belongs to the first group, for packets assigned to the first VL and (ii) depending on whether the given turn belongs to the second group for packets assigned to the second VL.

14. The method according to claim 13, wherein specifying the rules comprises specifying a forwarding rule that forbids the given turn, in response to detecting that the given turn belongs to the second group.

15. The method according to claim 13, wherein specifying the rules comprises specifying a forwarding rule that forbids the given turn, in response to detecting that a packet traversing the given turn belongs to the first group.

16. The method according to claim 13, wherein specifying the rules comprises, in response to detecting that the given turn belongs to the first group, specifying (i) a forwarding rule that permits the given turn and (ii) a corresponding VL modification rule that modifies the VL in the packet to the second VL.

17. The method according to claim 12, wherein specifying the rules comprises specifying a forwarding rule that permits a turn from an input port to an output port only when traversing the turn reduces a number of remaining hops to the given target.

18. The method according to claim 12, wherein specifying the rules comprises specifying a forwarding rule that permits a turn that does not reduce a number of remaining hops to the given target but that meets a specified total number of hops per path.

19. The method according to claim 12, wherein specifying the rules comprises, in response to detecting that a path from the given network element to the target must contain a turn that belongs to the second group, specifying a forwarding rule that forbids traversing the path.

20. The method according to claim 12, wherein the topology comprises a Cartesian topology selected from a list of Cartesian topologies comprising Mesh, Torus, Hypercube, generalized Hypercube and HyperX topologies.

21. The method according to claim 12, wherein the Cartesian topology comprises a Cartesian HyperX topology having up to three dimensions, and wherein specifying the rules comprises specifying the rules, so as to guarantee between any pair of network elements in the network, at least one path of up to three hops.

22. The method according to claim 12, therein specifying the rules comprises specifying a VL modification rule that refrains from modifying the VL of a packet assigned to the second VL.

23. A communication network, comprising a plurality of network elements interconnected in a Cartesian topology, wherein the network elements are configured to forward packets in accordance with rules that when applied to packets traversing respective network elements, guarantee that no deadlock conditions occur in the network, wherein the rules are specified based on a first group of turns and on a second group of turns in the Cartesian topology, each turn in the first group and each turn in the second group comprises an input hop from a previous network element to a current network element and an output hop from the current network element to a next network element, wherein the turns belonging to the first group are permitted for packets that (i) are initially assigned to a first Virtual Lane (VL) and (ii) are reassigned upon traversing a network element in the network to a different second VL, and wherein the turns belonging to the second group are forbidden for packets assigned to the second VL;

and wherein the rules specified for a given network element comprise (i) forwarding rules from one or more input ports to one or more output ports so that packets received in the given network element and are assigned to the second VL reach a given target coupled to the network without traversing any of the turns of the second group, and (ii) VL modification rules for reassigning packets, which traverse turns of the first group and which are assigned to the first VL, to the second VL.

24. A method for communication comprising:

in a communication network that comprises a plurality of network elements interconnected in a Cartesian topology, forwarding packets, by the network elements, in accordance with rules that when applied to packets traversing respective network elements, guarantee that no deadlock conditions occur in the network, wherein the rules are specified based on a first group of turns and on a second group of turns in the Cartesian topology, each turn in the first group and each turn in the second group comprises an input hop from a previous network element to a current network element and an output hop from the current network element to a next network element, wherein the turns belonging to the first group are permitted for packets that (i) are initially assigned to a first Virtual Lane (VL) and (ii) are reassigned upon traversing a network element in the network to a different second VL, and wherein the turns belonging to the second group are forbidden for packets assigned to the second VL;

and wherein the rules specified for a given network element comprise (i) forwarding rules from one or more input ports to one or more output ports so that packets received in the given network element and are assigned to the second VL reach a given target coupled to the network without traversing any of the turns of the second group, and (ii) VL modification rules for reassigning packets, which traverse turns of the first group and which are assigned to the first VL, to the second VL.

* * * * *